United States Patent [19]

Cook et al.

[11] 3,807,580

[45] Apr. 30, 1974

[54] DISAPPEARING BALE WEDGE FOR A BALE WAGON

[75] Inventors: Albert C. Cook; Lee D. Butler, both of Kingsburg, Calif.

[73] Assignee: Sperry Rand Corporation, New Holland, Pa.

[22] Filed: May 4, 1972

[21] Appl. No.: 250,441

[52] U.S. Cl. .............................................. 214/6 B
[51] Int. Cl. ............................................. B65g 57/32
[58] Field of Search ............ 214/6 B, 6 P, 518, 519, 214/501

[56] References Cited
UNITED STATES PATENTS

| | | | |
|---|---|---|---|
| 2,728,601 | 12/1955 | Quigley | 214/6 B |
| 3,155,415 | 11/1964 | Gale | 214/6 B |
| 3,395,814 | 8/1968 | Grey | 214/6 B |
| 3,638,808 | 2/1972 | Grey et al. | 214/518 |

Primary Examiner—Robert J. Spar
Attorney, Agent, or Firm—Frank A. Seemar; John R. Flanagan; Joseph A. Brown

[57] ABSTRACT

A disappearing bale stop or wedge for a bale wagon of the type adapted to both load and single bale unload. The disappearing bale wedge of the present invention comprises a first species having a support arm that is pivotally mounted beneath the upper surface of a tier forming and single bale unloading table of the bale wagon. The support arm is operative to maintain the wedge in a position that prevents premature actuation of the table during tier formation, and is further operative to move the wedge to an inoperative position during single bale unloading such that bales may be shifted on the table without interference from the wedge.

A second bale stop or wedge species is shown which is stationarily mounted relative to the chassis of said bale wagon, but has a "disappearing" effect as the tier forming and single bale unloading table moves to a single bale unloading position since the stop or wedge normally projects through an opening formed within said table during tier formation.

8 Claims, 7 Drawing Figures

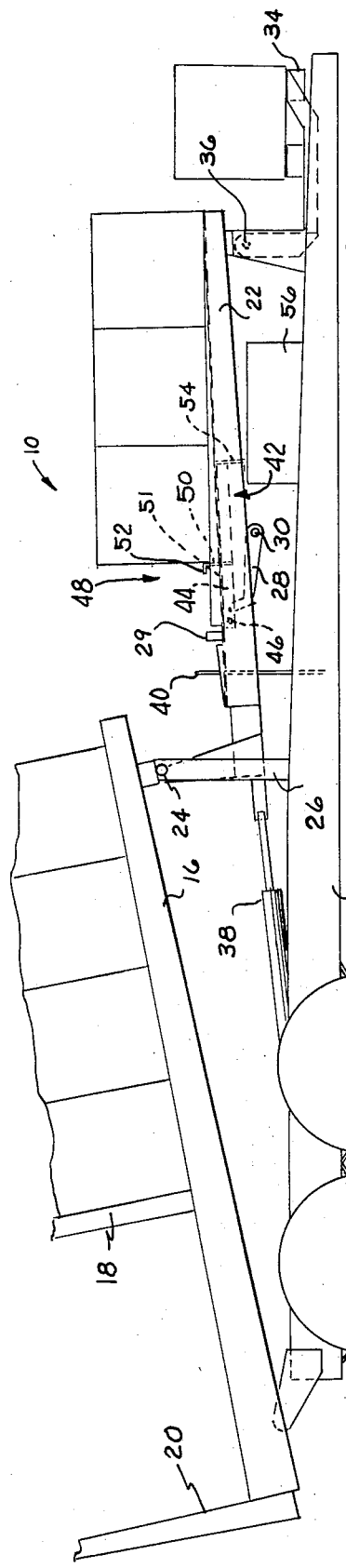
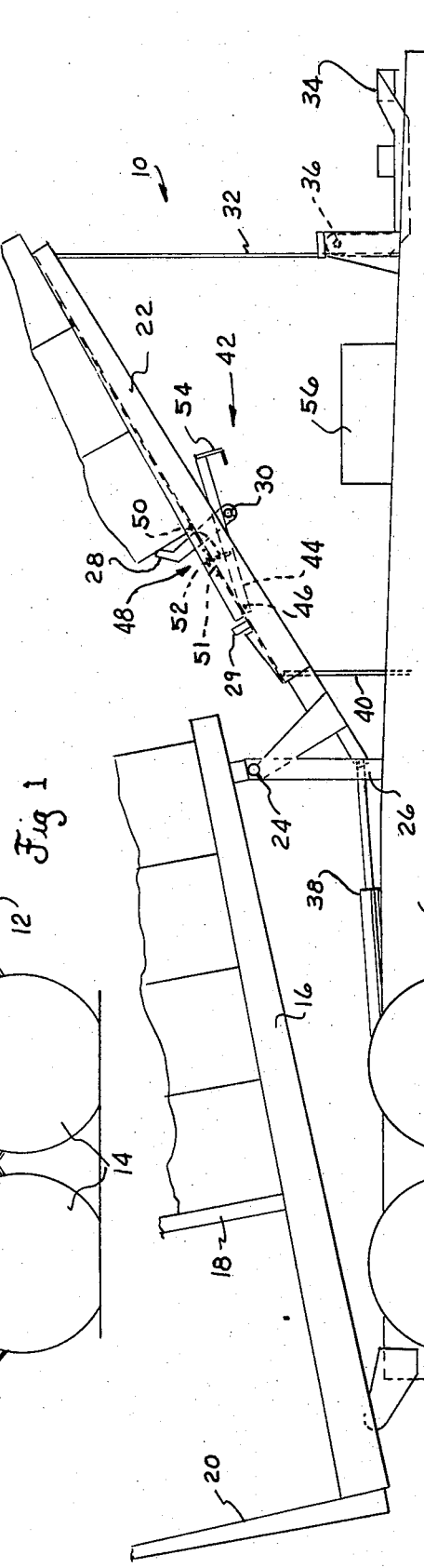
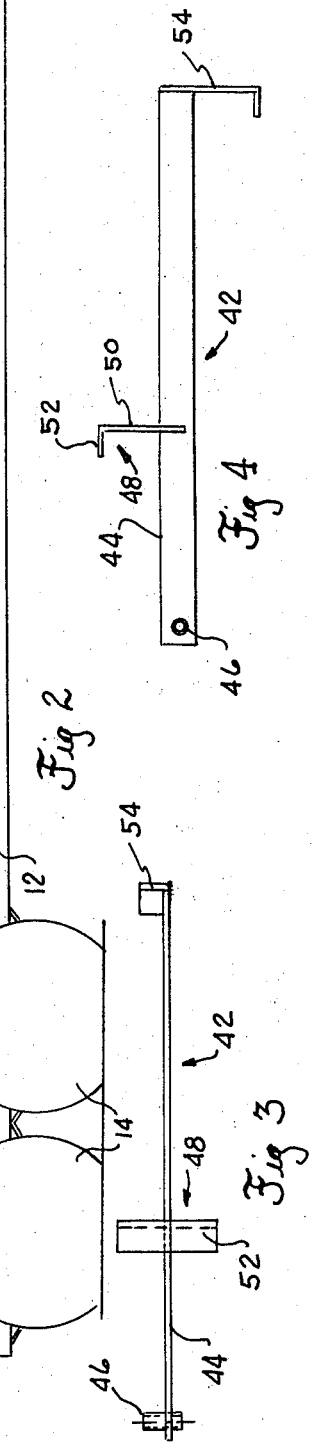

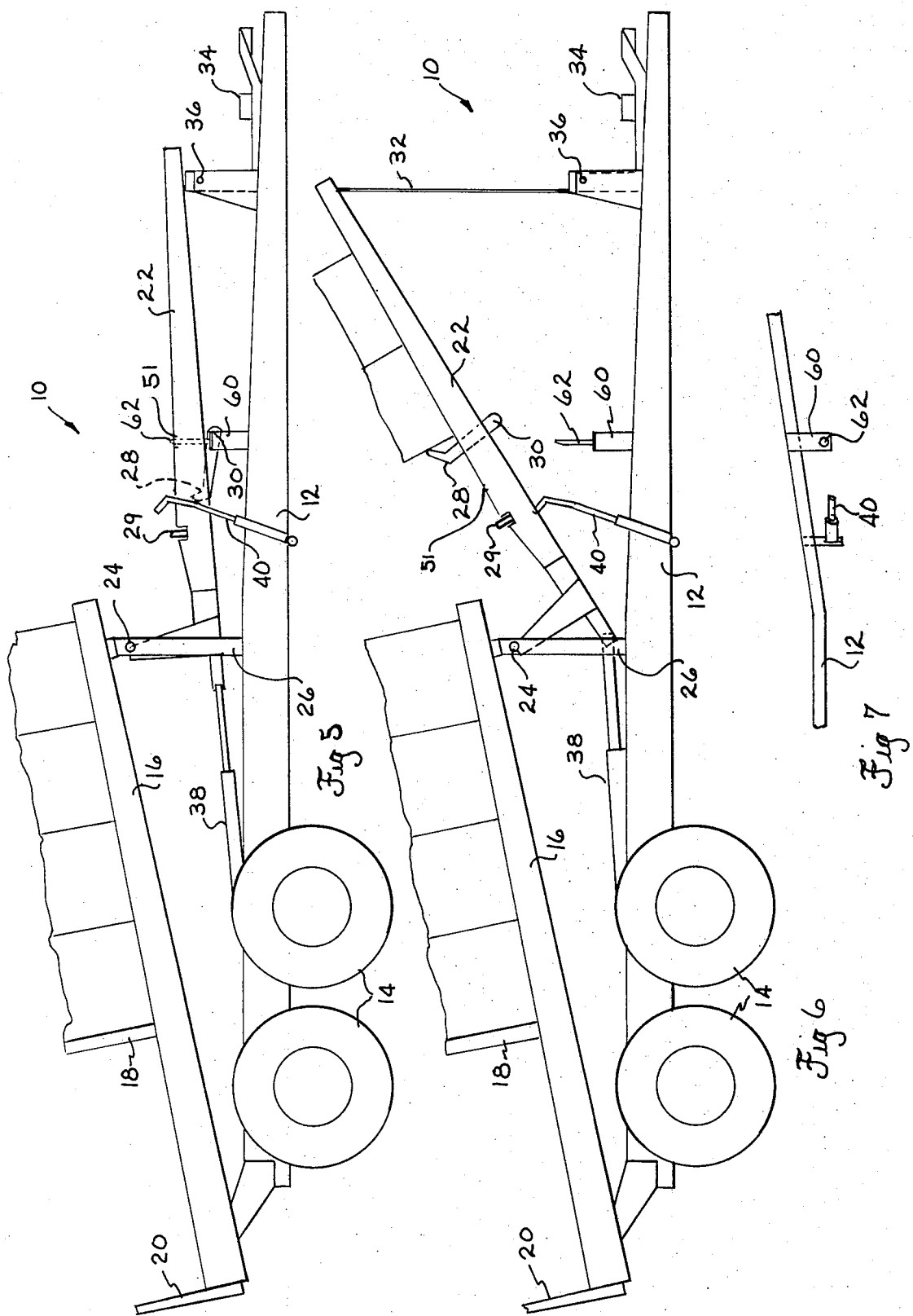

DISAPPEARING BALE WEDGE FOR A BALE WAGON

BACKGROUND OF THE INVENTION

The present invention relates to bale wagons, and more particularly to bale wagons adapted to load and single bale unload.

Today most single bale unloading bale wagons of the prior art are also adapted to pick up bales from the field, form the bales into tiers and deposited the formed tiers on a load bed in side-by-side relationship to form a stack thereon. Such a single bale unloading bale wagon is shown in U.S. Pat. No. 3,502,230 to D. M. Grey et al. In a bale wagon of the type shown in the Grey patent, bales are received by a first table and transferred in layers to an adjacent horizontal table, sometimes referred to as a second table or a transfer table. As the layers are transferred from the first table to the second table, a tier of bales is formed thereon. The second table is provided with a trip mechanism generally about the rear thereof that is operatively connected to a power source for moving the second table from the horizontal position to a generally vertical position where the tier thereon may be deposited on a rearwardly disposed loan bed. The trip mechanism is particularly spaced about the rear of the second table such that it is engaged and actuated by a bale of the rearmost layer when the last layer of the tier is deposited on the second table by the first table. Since bale wagons must travel over varying ground terrain, it is not uncommon for the bales on the second table to tend to slide and actuate the trip mechanism before the tier is completed. Therefore, in the past it has been necessary to place a small wedge on the upper surface of the second table closely adjacent the trip mechanism for preventing the bales from prematurely sliding into engagement with the trip mechanism and causing the second table to cycle before the full tier is completely formed thereon.

In the case of single bale unloading bale wagons, the second table is also used to receive a tier and to unload bales therefrom one bale at a time. And as will be appreciated from studying the above referred to Grey patent, during the single bale unloading operation the second table includes a plurality of bale separating hooks that are operative to move a portion of the tier up the second table, which during single bale unloading is disposed at an incline to the chassis structure. These bale separating hooks cooperate with the inclined second table to separate layer of the tier from one or more layers of the tier. During the process of continuing to separate a layer from the other layers of the tier, the bales must slide up and down the inclined second table. The presence of the stationary bale wedge that was utilized during loading and tier formation now tends to disrupt the single bale unloading operation as the wedge inhibits free sliding on the second table.

SUMMARY OF THE INVENTION

Applicants' invention relates to a disappearing bale wedge for a single bale unloading bale wagon wherein the bale wedge utilized during tier formation to prevent actuation of the second table now disappears from the upper surface of the second table when the second table is raised to its inclined single bale unloading position. Once the second table is brought back to its normal horizontal tier forming position during the loading operation, the present invention provides for the reappearing of the bale wedge so as to prevent premature actuation of the second table.

In particular, applicants' invention relates to a new disappearing bale wedge assembly that comprises a generally elongated support arm pivotally mounted beneath the upper surface of the second table and including a wedge fixed thereto and extending therefrom. The second table is provided with an opening formed generally above the wedge, whereby the upward movement of the support arm results in the wedge projecting through the opening formed thereabove and thereby being disposed in its operative mode. The downward pivotal movement of the support arm is limited by stop means secured to the underside of the second table. The support arm normally is disposed in a downward position resting against said stop means under the influence of gravity when the second table is in its inclined single bale unloading position. To pivot the support arm upwardly and consequently place the bale wedge in its operative position, an actuating structure is spaced generally below the second table and is aligned with the supporting arm to engage the same in response to the second table assuming the horizontal tier forming position.

It is therefore the principle object of the present invention to provide the tier forming and single bale unloading table of a bale wagon adapted to both load and single bale unload with a bale stop or wedge assembly that assumes an operative position with respect to the table during tier formation to prevent premature actuation of the table, and further assumes an inoperative position during single bale unloading such that the bales on the table may be shifted without interference from the wedge.

A further object of the present invention resides in the provision of mounting means for the wedge that is responsive to the movement of the tier forming and single bale unloading table from a generally horizontal tier forming position to an inclined single bale unloading position.

More particularly, it is the object of the present invention to provide a wedge mounting structure that is adapted to position the wedge in an operative position when said table assumes the horizontal tier forming position, and is further responsive to the movement of said table to the inclined single bale unloading position to position said wedge in the inoperative position, whereby bales may be shifted along the upper support surface without interference from the wedge.

Other objects and advantages of the present invention will become apparent and obvious from a study of the following description and the accompanying drawings which are merely illustrative of the present invention.

BRIEF DESCRIPTION OF THE DRAWINGS

FIG. 1 is a fragmentary side elevational view of a bale wagon having a tier forming and single bale unloading table disposed in a generally horizontal tier forming position; and wherein the disappearing bale wedge assembly of the present invention is shown with the wedge disposed in its operative position generally between the portion of the tier being formed and a trip mechanism.

FIG. 2 is a fragmentary side elevational view of the bale wagon shown in FIG. 1 with the tier forming and single bale unloading table disposed in the inclined single bale unloading position.

FIG. 3 is a plan view of the disappearing bale wedge assembly of the present invention.

FIG. 4 is a side elevational view of the same disappearing bale wedge assembly as shown in FIG. 3.

FIGS. 5 and 6 are side elevational views of a bale wagon illustrating a disappearing bale stop or wedge of a second species.

FIG. 7 is a fragmentary plane view of the second species.

DESCRIPTION OF THE PREFERRED EMBODIMENT

With reference to the drawings, particularly FIGS. 1 and 2, a pull type bale wagon, of the three table type and adapted for both loading and single bale unloading, is shown therein and indicated generally by the numeral 10. In particular, the bale wagon 10 generally comprises a fore-and-aft extending chassis structure 12 with a pair of tandemly arranged rear wheels 14 rotatively mounted on each side thereof about the rear. Mounted to the chasses 12 and generally overlying a rear portion thereof is an inclined load bed 16 which includes a rolling rack 18 of the conventional type moveably mounted thereon and adapted to move fore-and-aft therealong during the operation of the bale wagon. Fixed to the rear end of the load bed 16 is a series of laterally spaced generally upstanding load rack fingers 20.

Spaced forwardly of the load bed 16 is a tier forming and single bale unloading table 22 (also referred to as a second table or transfer table), the table 22 being pivotally mounted about a transverse axis 24 supported by a support structure 26 extending generally upright from the chassis structure 12. Tier forming and single bale unloading table 22 is provided with a series of bale separating hooks 28, only one of which is shown, the bale separating hooks being laterally spaced and secured to a transversely extending rockshaft 30 that is secured beneath the table. Spaced generally rearwardly of the bale separating hooks 28 is a transverse cross conveyor, denoted by the numeral 29, which function during single bale unloading to convey a layer at a time from the table 22. It may be particularly observed from FIG. 2 that the tier forming and single bale unloading table 22 is disposed at an incline relative to the chassis structure 12 during the single bale unloading operation. The table 22 may be held at such an inclined position by a prop structure 32 that is adapted to extend between the chassis 12 and a front portion of the table 22. Also, it is appreciated that during the single bale unloading operation, the bale separating hooks 28 are controlled in general timed relationship with respect to the movement of the cross conveyor 29. Such a control system may be observed and studied in the previously referred to Grey et al patent, U.S. Pat. No. 3,502,230. But briefly summarizing the single bale unloading operation, a tier at a time is received from the load bed 16 with each tier comprising a series of layers disposed in side-by-side relationship. Before the lowermost layer can be conveyed efficiently from the table 22, the bale separating hooks 28 are actuated from a down position generally below the upper service of the table 22 (FIG. 1) to a tier engaging position, as particularly shown in FIG. 2. In the tier engaging position, the bale separating hooks engage a portion of the tier and gently push the bales up the inclined table 22, thereby separating the lowermost layer from the layers disposed thereabove, and consequently allowing the lowermost layer to be conveyed from the unloading table 22 without interference from adjacent bales. Once the lowermost layer of bales has been conveyed from the table 22, the bale separating hooks 28 are actuated to their down position, allowing the tier portion to slide down the single bale unloading table 22. Once the bales have moved down the unloading table 22, the bale separating hooks are once again actuated to the up position (FIG. 2) such that another portion of the tier is separated from the lowermost layer now generally overlying the cross conveyor 29. This process is continued until the entire tier is unloaded from the unloading table.

Continuing to refer to the bale wagon 10 shown particularly in FIGS. 1 and 2, it will be observed that a first table 34 is generally spaced forwardly of the tier forming and single bale unloading table 22. The first table 34 is pivotally mounted about a transverse axis 36 that extends generally parallel to the transverse pivot axis 24 of the table 22. In the present disclosure, the first table 34 is principally utilized in the loading operation to receive layers of bales, as shown in FIG. 1, and to deposit the layers of bales on the table 22 to form a tier of bales thereon.

The tier forming and single bale unloading table 22 is powered by a hydraulic cylinder 38 anchored to the chassis structure 12 and having a rod extending therefrom and connecting to the table. The cylinder 38 is controlled by a conventional directional fluid control valve, not shown, and the control valve is actuated by a trip mechanism 40 pivotally mounted to the chassis structure and extending generally upwardly through an opening, not shown, formed in the rear portion of the table 22. Although not particularly illustrated, the trip mechanism 40 is particularly adapted to actuate the control valve that controls cylinder 38 in response to the rearward movement thereof initiated by the rearward movement of the bales on the unloading table 22. More specifically, the trip mechanism 40 is particularly spaced in relationship to the table 22 such that a bale of the rearmost layer of the tier will trip the trip mechanism 40 as the last layer is deposited on the single bale unloading table 22 by the first table 34.

To prevent the bales on the unloading table 22 from accidentally sliding into engagement with the trip mechanism 40 as the bale wagon 10 traverses various ground terrain conditions, a disappearing bale wedge or stop assembly, indicated generally by the numeral 42 and hereafter referred to as a stop or wedge, is disposed on the underside of the tier forming and single bale unloading table 22 and is particularly adapted to project through the upper surface of the table 22 when the table is in the tier forming position (FIG. 1). In this position the wedge assembly tends to prohibit the sliding of bales prematurely into the trip mechanism 40 and causing the table 22 to cycle before the tier is completley formed. Viewing the disappearing wedge assembly 42 in detail, it will be seen from FIGS. 1–4 that the wedge assembly basically comprises a generally elongated support arm 44 pivotally secured about a rear end portion by a pivot pin 46 to the underside of the table 22. Fixed intermediately on the support arm 44 is a generally L-shaped wedge structure indicated generally by the numeral 48, with the wedge structure including a leg 50 and a base portion 52 (FIG. 4). To accommodate the wedge structure 48, an opening 51 is formed in the table 22 above the wedge such that it may readily pass therethrough. From FIGS. 1 and 2, it is seen that the support arm generally extends forwardly from the pivot pin 46 and is particularly disposed between the table 22 and the rockshaft 30, with the rockshaft 30 serving as stop means for limiting the downward pivotal movement of the support arm 44.

Continuing to refer to the disappearing bale wedge assembly 42, it is seen that the front end portion of the support arm 44 includes a bracket 54 that is aligned with a downwardly spaced bale wedge actuating structure 56 that is generally supported about the front portion of the chassis 12. For purposes of explanation, the bale wedge actuating structure 56 of the present invention takes the form of the hydraulic oil tank used for storing the fluid employed by the various hydraulic components of the bale wagon. But, as seen in FIG. 1, the principal function of the bale wedge actuating structure 56 is to engage the bracket 54 of the support arm 44 once the tier forming and single bale unloading table 22 has reached the horizontal tier forming position. The engagement of actuating structure 56 with the bale wedge assembly 42 causes the arm 44 to pivot upwardly away from the traverse rockshaft 30, and consequently causes the wedge 48 to project through the opening 51 formed in the table 22. The presence of the wedge 22, as seen in FIG. 1, generally precludes the adjacent rearmost bale from sliding rearwardly against the trip mechanism 40. However, it should be observed that the wedge 48 only projects slightly above the surface of the table 22, thereby allowing the bale disposed in front thereof to slide thereover as the last layer is deposited on the table 22 by the first table 34.

As seen in FIG. 2, when the unloading table 22 is raised to the single bale unloading inclined position, the support arm 44 tends to pivot downwardly under the influence of gravity until the arm comes into contact with the traverse rockshaft 30. The downward movement of the support arm 44 causes the wedge structure 48 to move down below the upper support surface of table 22 to what is referred to as an inoperative position. Therefore, it is appreciated that during the single bale unloading operation, the bales of the tier may slide up and down the inclined table 22 without interference from the wedge 48.

With reference to FIGS. 5-7, a second species for the disappearing bale wedge or stop of the present invention is shown. In particular the second species comprises a support structure 60 fixed to the chassis 12 of the bale wagon 10 and particulary disposed such that it lies just below the transfer table 22 when said table assumes the normal horizontal position, as shown in FIG. 5. Fixed to the support 60 and extending generally upright thereabove is a bale stop or wedge 62 of the second species, the wedge being particularly spaced in front of the trip mechanism 40. The stop or wedge 62 of the second species is particularly spaced relative to the second table 22 such that it normally projects through an opening 51 formed in the transfer table 22 when that table assumes the normal horizontal position, as shown in FIG. 5. Because the wedge or stop 62 of the second species is stationarily mounted to the chassis structure 12 of the bale wagon, it is seen that the movement of the table 22 from its horizontal position to a single bale unloading position, as shown in FIG. 6, results in the stop or wedge 62 vacating the opening 51 in the table 22 and consequently no longer being effective as a stop on the table 22. Thus, it follows that the single bale unloading operation can be carried out without interference from the wedge or stop 62 which only becomes functional when the transfer table 22 assumes the horizontal tier forming and loading position.

The terms, "upper" "lower," "forward," "rearward" etc. have been used herein merely for the convenience of the foregoing specification and in the appended claims to describe the disappearing bale wedge for a bale wagon and its parts as oriented in the drawings. It is to be understood, however, that these terms are in no way limiting to the invention since the disappearing bale wedge for a bale wagon may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Have thus described our invention, what we claim is:

1. In a loading and single bale unloading bale wagon of the type characterized by a wheel supported chassis structure; a load bed mounted on said chassis structure; a combination tier forming and unloading table having an upper support surface and wherein said table is moveably mounted adjacent said load bed and adapted to assume a generally horizontal position during loading for receiving and forming bales into a tier, and further adapted during unloading to assume an inclined position relative to said chassis structure for unloading individual bales from a tier; power means for moving said tier forming and unloading table from said horizontal position to a generally vertical position during loading such that the tiers formed thereon may be deposited on the load bed; actuating means associated with said tier forming and unloading table for actuating said power means in response to the tier forming table receiving a complete tier, and thereby causing said tier forming table to move from its horizontal position to the vertical position where the tier disposed thereon is deposited on said load bed; the improvement comprising, a disappearing wedge normally disposed during loading adjacent said actuating means and spaced above the upper surface of said tier forming and unloading table so as to assume an operative position to prevent bales on said tier forming and unloading table from sliding into engagement with said actuating means and prematurely actuating said power means; and moveable mounting means having said wedge secured thereto, and wherein said mounting means is responsive to the movement of said tier forming and unloading table from the horizontal position to the unloading position for moving said wedge from said operative position to an inoperative position, whereby bales may be moved along the upper surface of the tier forming and unloading table during single bale unloading without interference from the wedge.

2. The combination, as recited in claim 1, wherein said moveable mounting means comprises a support arm pivotally mounted to the underside of said tier forming and unloading table, and wherein said wedge is fixed thereto and extends therefrom towards the upper support surface of the tier forming and unloading table.

3. The combination, as recited in claim 2, wherein means is provided for pivoting said support arm in response to the tier forming and unloading table moving from the unloading position to the horizontal position, thereby causing the wedge to extend slightly above the upper surface of the tier forming and unloading table.

4. In a loading and single bale unloading bale wagon having a wheel supported chassis; a load bed mounted on said chassis; a table moveably mounted adjacent said load bed and including an upper bale support surface, said table being adapted to assume a generally horizontal position during loading for receiving bales and further adapted during unloading to assume an inclined position relative to said chassis for unloading individual bales; means for moving said table from said horizontal position to a generally vertical position during loading such that bales received thereon may be deposited on said load bed; and actuating means associated with said table for actuating said table moving means, the improvement comprising a disappearing bale wedge assembly normally operative to preclude premature engagement of said actuating means when said table assumes said horizontal position and inoperative when said table assumes said inclined single bale unloading position, said disappearing bale wedge assembly comprising: a support arm pivotally mounted beneath said upper surface of said table; a wedge secured to said support arm and extending therefrom; and opening formed within said table generally above said wedge; stop means secured to the underside of said table and spaced generally below said upper surface thereof and spaced below said support arm, thereby limiting the downward movement of said support arm; and an actuating structure spaced generally below said table and adapted to engage said support arm when said table assumes said horizontal position such that said support arm is vertically spaced from said stop means and said wedge projects through said opening and is operative to prohibit premature bale engagement with said actuating means, and whereby the movement of said table to said inclined single bale unloading position results in said actuating structure disengaging said support arm, resulting in said support arm pivoting downwardly under the influence of gravity and being held by said stop means, whereby said wedge moves below said opening and assumes an inoperative position during single bale unloading.

5. The combination, as recited in claim 4, wherein said actuating means extends up through an opening formed in the rear portion of said table when said table assumes the horizontal position; and wherein said wedge and the opening therefor are spaced generally forwardly of said actuating means such that in the horizontal position the wedge assumes a position generally between the bales received on the table and the actuating means, thereby preventing the bales on the table from prematurely sliding into the actuating means.

6. The combination, as recited in claim 4, wherein said support arm is generally elongated member and wherein said wedge is secured to an intermediate portion thereof.

7. The combination, as recited in claim 6, wherein said wedge is of a general L-shape and includes a leg secured to said support arm at approximately right angles thereto and a base portion extending generally rearwardly from an upper portion of said leg.

8. In a loading and single bale unloading bale wagon having a wheel supported chassis; a load bed mounted on said chassis; a combination tier forming and unloading table having an upper support surface and wherein said table is moveably mounted adjacent said load bed and adapted to assume a generally horizontal position during loading for receiving and forming bales into a tier, and further adapted during unloading to assume an inclined position relative to said chassis for unloading individual bales from a tier; means for moving said table from said horizontal position to a generally vertical position during loading such that the tiers formed thereon may be deposited on the load bed; actuating means associated with said table for actuating said moving means in response to said table receiving a complete tier, and thereby causing said table to move from said horizontal position to said vertical position where the tier disposed thereon is deposited on said load bed; the improvement comprising a stop means mounted on said chassis and projecting through the upper surface of said table a limited extent when said table is in its horizontal position during loading to prevent the bales placed on said table from engaging said actuating means prior to the completion of the tier forming operation; and means for mounting said stop relative to the upper surface of said table so that when said table is moved from its horizontal position during loading to its inclined position during unloading said stop will be disposed below the upper surface of said table.

* * * * *